United States Patent
Kasturi et al.

(10) Patent No.: US 7,657,275 B2
(45) Date of Patent: Feb. 2, 2010

(54) MITIGATION OF TRANSMIT POWER SPIKES FOR A POWER-CONTROLLED DATA TRANSMISSION IN A WIRELESS COMMUNICATION SYSTEM

(75) Inventors: Nitin Kasturi, Los Gatos, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 10/841,299

(22) Filed: May 7, 2004

(65) Prior Publication Data

US 2005/0249149 A1 Nov. 10, 2005

(51) Int. Cl.
H04B 7/00 (2006.01)
(52) U.S. Cl. .................. 455/522; 455/69; 370/318; 370/320
(58) Field of Classification Search .............. 455/69, 455/454, 456.3, 522, 524, 67.11, 67.13; 370/328, 370/329, 342, 318, 320, 335
See application file for complete search history.

(56) References Cited

U.S. PATENT DOCUMENTS

| | | | |
|---|---|---|---|
| 6,928,296 B2 * | 8/2005 | Kanemoto et al. .......... 455/522 |
| 2004/0005906 A1 * | 1/2004 | Okumura et al. ........... 455/522 |
| 2004/0114555 A1 * | 6/2004 | Hayashi et al. ............ 370/329 |
| 2004/0160914 A1 * | 8/2004 | Sarkar ..................... 370/329 |
| 2004/0162083 A1 * | 8/2004 | Chen et al. ................ 455/454 |

FOREIGN PATENT DOCUMENTS

| | | |
|---|---|---|
| EP | 0682417 | 11/1995 |
| EP | 1233541 | 8/2002 |
| WO | 0076084 | 12/2000 |
| WO | WO 0076084 A1 * | 12/2000 |

OTHER PUBLICATIONS

3GPP TS 25.211 V6.0.0 (Dec. 2003): 3rd Generation Partnership Project; Technical Specification Group Radio Access Network; Physical Channels and Mapping of Transport Channels onto Physical Channels (FDD)(Release 6).

(Continued)

Primary Examiner—Quochien B Vuong
(74) Attorney, Agent, or Firm—Howard H. Seo; Eric Ho (57) ABSTRACT

Techniques to mitigate spikes in transmit power, by reducing the magnitude and/or duration of the spikes, are described. Initially, power control is performed in a normal manner and in accordance with a transmit power control (TPC) scheme. If a (e.g., upward) transmit power spike is detected, the power control is performed in a manner to mitigate the adverse effects of the spike and in accordance with another TPC scheme. An upward transmit power spike may be detected, e.g., if a predetermined number of consecutive TPC commands in the upward direction is obtained for increasing transmit power. The upward transmit power spike may be mitigated by limiting the transmit power, reducing the rate of transmit power adjustment in the upward direction, delaying and/or filtering TPC decisions used for transmit power adjustment, preventing upward adjustment of transmit power, and so on. Multiple states may be defined and used to facilitate power control with spike mitigation.

33 Claims, 7 Drawing Sheets

OTHER PUBLICATIONS

3GPP TS 25.212 V5.7.0 (Dec. 2003): 3rd Generation Partnership Project; Technical Specification Group Radio Access Network; Multiplexing and Channel Coding (FDD)(Release 5).

3GPP TS 25.213 V3.9.0 (Dec. 2003): 3rd Generation Partnership Project; Technical Specification Group Radio Access Network; Spreading and Modulation (FDD)(Release 1999).

3GPP TS 25.214 V5.7.0 (Dec. 2003): 3rd Generation Partnership Project; Technical Specification Group Radio Access Network; Physical Layer Procedures (FDD)(Release 5).

3GPP2 C.S0001-C Version 1.0 (May 2002): 3rd Generation Partnership Project 2 "3GPP2" Introduction to cdma2000 Standards for Spread Spectrum Systems, Release C.

TIA/EIA/IS-856-1 Standard (Addendum No. 1 to TIA/EIA/IS-856) (Jan. 2002): cdma2000 High Rate Packet Data Air Interface Specification, Addendum 1.

TIA/EIA/IS-95-B Standard (Upgrade and Revision of TIA/EIA-95-A) (Mar. 1999): Mobile Station-Base Station Compatibility Standard for Wideband Spread Spectrum Cellular Systems.

Partial International Search Report, PCT/US2005/013520 - International Search Authority - European Patent Office, Aug. 1, 2005.

International Search Report, PCT/US2005/013520 - International Search Authority - European Patent Office, Oct. 7, 2005.

Written Opinion, PCT/US2005/013520 - International Search Authority - European Patent Office, May 3, 2007.

International Preliminary Examination Report, PCT/US2005/013520 - International Preliminary Examining Authority - US, May 22, 2008.

* cited by examiner

MITIGATION OF TRANSMIT POWER SPIKES FOR A POWER-CONTROLLED DATA TRANSMISSION IN A WIRELESS COMMUNICATION SYSTEM

BACKGROUND

I. Field

The present invention relates generally to communication, and more specifically to techniques for controlling transmit power used for a data transmission in a wireless communication system.

II. Background

In a wireless communication system, a wireless device (e.g., a cellular phone) communicates with one or more base stations via transmissions on the downlink and uplink. The downlink (or forward link) refers to the communication link from the base station to the wireless device, and the uplink (or reverse link) refers to the communication link from the wireless device to the base station. The downlink and uplink are allocated different frequency bands in a frequency division duplex (FDD) system.

In a Code Division Multiple Access (CDMA) system, which is an FDD system, a base station may simultaneously receive uplink transmissions from multiple wireless devices. Since these uplink transmissions occur over a shared frequency band, the uplink transmission from each wireless device acts as interference to the uplink transmissions from the other wireless devices. For each wireless device, the interference due to the other wireless devices degrades the received signal quality of the wireless device. The signal quality (denoted as "SIR") may be quantified by a signal-to-noise-plus-interference ratio or some other quantity. Each wireless device needs a particular received SIR or better in order to achieve the desired level of performance, which may be quantified by a particular block error rate (BLER) or some other performance measurement.

To efficiently utilize the uplink capacity of a base station, an uplink power control mechanism is typically used to control the transmit power of each wireless device. This power control mechanism is normally implemented with two power control loops, which are often called an "inner" loop and an "outer" loop. The inner loop adjusts the transmit power of the wireless device such that its received SIR, as measured at the base station, is maintained at an SIR target. The outer loop adjusts the SIR target to maintain a BLER target, which may be, for example, 1% BLER. The wireless device transmits with excessive power, thereby causing too much interference, if the BLER is too low and provides unsatisfactory performance if the BLER is too high. The uplink power control mechanism thus attempts to reduce transmit power and interference while maintaining the desired link performance for the wireless device.

The uplink power control mechanism works well if transmit power control (TPC) commands sent by the base station to direct each wireless device to adjust its transmit power are both accurately generated by the base station and reliably received by the wireless device. However, either one, or both, of these premises may not be true for various reasons, as described below. When such is the case, a sudden and large change in transmit power (i.e., a "transmit power spike") may occur for the wireless device. The transmit power spike may cause various deleterious effects. For example, a transmit power spike in an upward direction (i.e., an "upward" transmit power spike) may cause excessive interference to other wireless devices and reduced uplink capacity. A transmit power spike in a downward direction (i.e., a "downward" transmit power spike) may cause performance degradation of the affected wireless device and possibly a dropped call. There may also be a ripple or cascade effect whereby an upward transmit power spike in one wireless device causes interference and results in spikes in other wireless devices. All of these effects are undesirable.

There is therefore a need in the art for techniques to control the transmit power of a wireless device in a manner to mitigate the adverse effects of transmit power spikes.

SUMMARY

Techniques to mitigate spikes in transmit power are described herein. These techniques may reduce the magnitude and/or the duration of transmit power spikes, and may be used to mitigate only upward transmit power spikes, only downward transmit power spikes, or both upward and downward spikes.

Initially, power control is performed in a normal manner and in accordance with a TPC scheme selected for use, as described below. If a transmit power spike in the direction to be mitigated (e.g., upward) is detected, then power control is performed in a manner to mitigate the adverse effects of the transmit power spike and in accordance with another TPC scheme. A transmit power spike may be detected, for example, (1) if a predetermined number of consecutive TPC decisions is obtained to adjust the transmit power in the direction of the spike, (2) if N out of the last T TPC decisions are for adjusting the transmit power in the direction of the spike, (3) if the transmit power is adjusted by a predetermined amount or more within a predetermined time window, or (4) based on some other criteria. The transmit power spike may be mitigated in various manners such as, for example, by (1) limiting the transmit power to be within a transmit power limit, (2) reducing the rate at which the transmit power can be adjusted in the direction of the spike, (3) delaying and/or filtering TPC decisions used for transmit power adjustment, (4) preventing adjustment of the transmit power in the direction of the spike, and so on. Multiple states (or modes) may be defined and used to facilitate power control with and without spike mitigation, as described below. In general, different behaviors for power control and spike mitigation may be achieved by generating TPC decisions and/or adjusting the transmit power in different manners.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
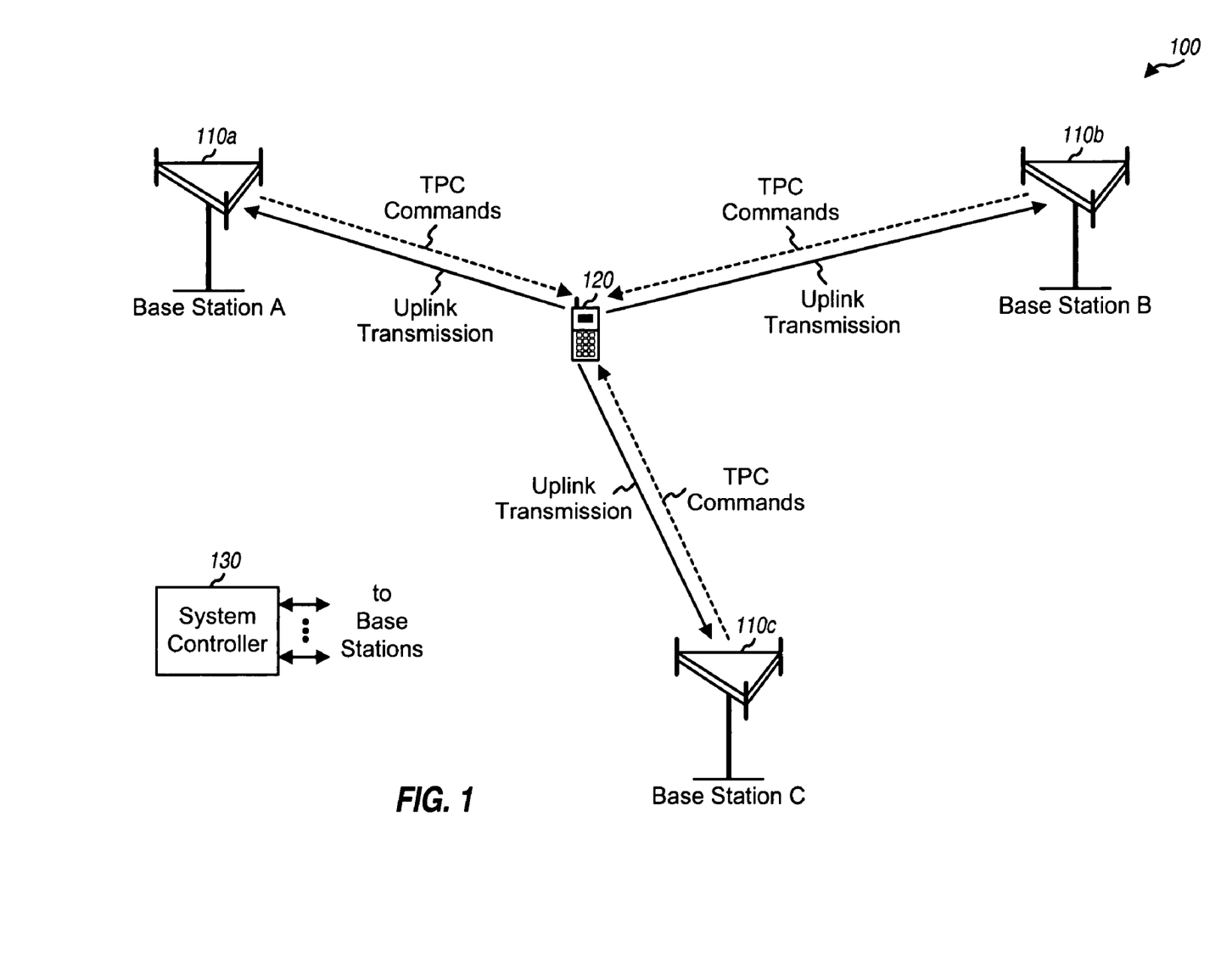
FIG. 1 shows a wireless communication system.

FIG. 1 shows a wireless communication system 100. For simplicity, only three base stations 110a, 110b, and 110c and one wireless device 120 are shown in FIG. 1. A base station is a fixed station that communicates with wireless devices, and may also be referred to as a Node B, a base transceiver system (BTS), an access point, or some other terminology. A system controller 130 couples to base stations 110 and may further couple to other network entities. System controller 130 provides coordination and control for the base stations coupled to it and further controls the routing of data for the wireless devices served by these base stations. System controller 130 may also be referred to as a radio network controller (RNC), a base station controller (BSC), a mobile switching center (MSC), or some other terminology.

A wireless device may be fixed or mobile, and may also be referred to as a user equipment (UE), a mobile station, a terminal, or some other terminology. A wireless device may communicate with one or multiple base stations on the downlink and/or one or multiple base stations on the uplink at any given moment. This depends on whether the wireless device is active, whether soft handover is supported by the system, and whether the wireless device is in soft handover. An N-way soft handoff will be the same for both the uplink and downlink. In FIG. 1, wireless device 120 is in soft handover on the uplink, and its uplink transmission is received by all three base stations 100a, 100b, and 100c. Wireless device 120 also receives TPC commands from all three base stations while in soft handover. Wireless device 120 maintains an "active set" that contains all of the base stations (or "cells" or "sectors") currently in communication with the wireless device.

System 100 may be a CDMA system that may implement one or more CDMA standards such as Wideband-CDMA (W-CDMA), IS-2000, IS-856, IS-95, and so on. System 100 may also be a Time Division Multiple Access (TDMA) system that may implement one or more TDMA standards such as Global System for Mobile Communications (GSM). These standards are well known in the art. System 100 may also be a Frequency Division Multiple Access (FDMA) system.

The techniques for mitigating transmit power spikes, as described herein, may be used for various wireless communication systems that employ closed-loop power control. These techniques may also be used for the uplink as well as the downlink. For clarity, these techniques are specifically described below for uplink power control in a W-CDMA system.

On the uplink, the capacity of each base station is limited by the total power received by the base station. To efficiently utilize the uplink capacity, the transmit power of each wireless device is typically controlled to be as low as possible to reduce interference while maintaining the desired level of performance.

Figure 2:
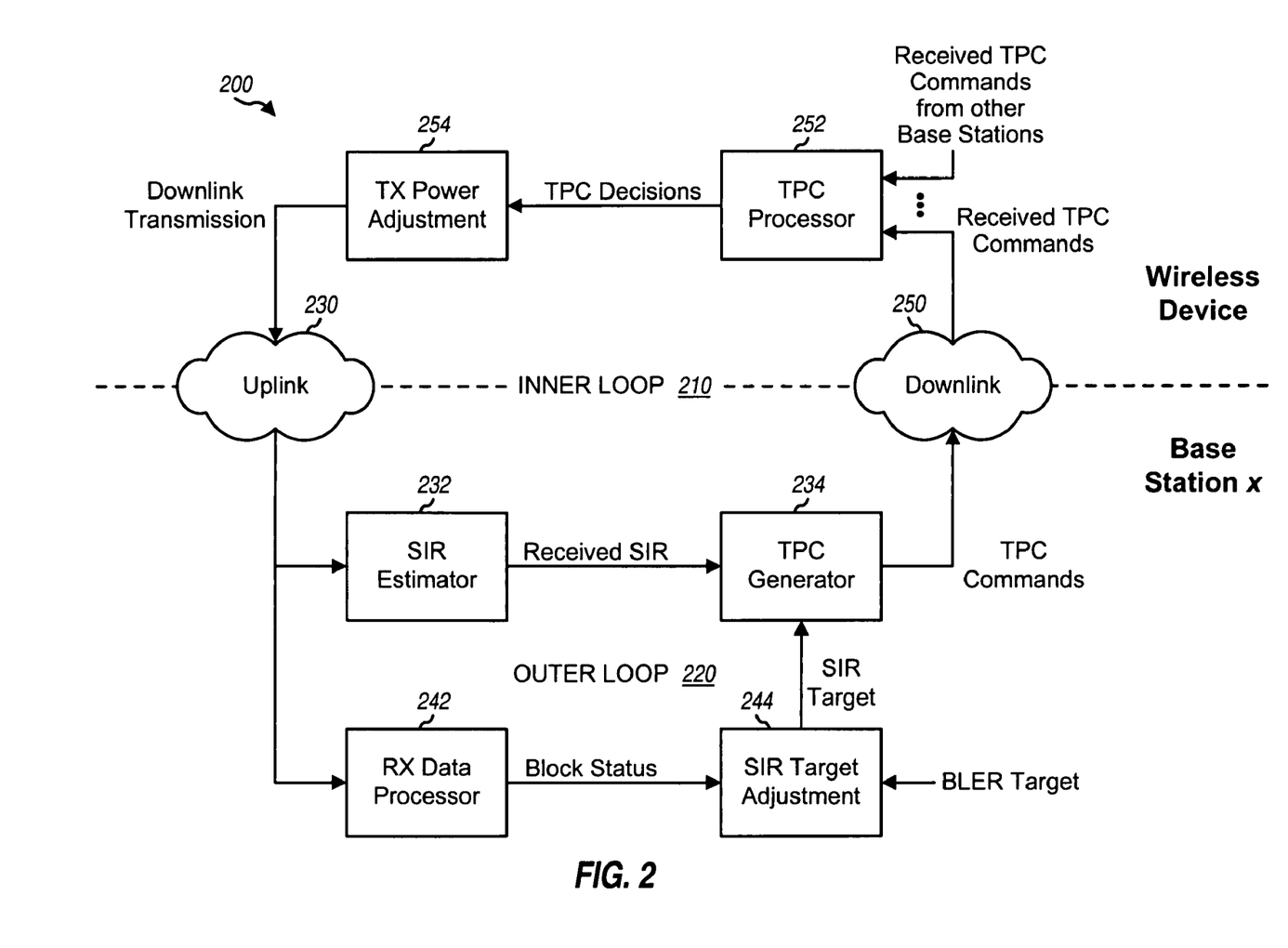
FIG. 2 shows a power control mechanism.

FIG. 2 shows a power control mechanism 200 that may be used to control the transmit power for an uplink data transmission. Power control mechanism 200 includes an inner loop 210 and an outer loop 220. If wireless device 120 is in soft handover and communicating with multiple base stations (or node Bs, in W-CDMA terminology), then a separate inner loop 210 is maintained by each of these base stations for the wireless device. A single outer loop 220 is maintained for wireless device 120 by a network entity (e.g., system controller 130). FIG. 2 shows various processing units for the inner and outer loops. These units reside at wireless device 120, a base station x (which is one of the base stations in the active set of wireless device 120), and system controller 130.

Inner loop 210 for each base station attempts to maintain the received SIR for the uplink transmission, as measured at that base station, as close as possible to an SIR target for wireless device 120. For inner loop 210, an SIR estimator 232 estimates the received SIR for the uplink transmission (e.g., based on a pilot received from wireless device 120) and provides the received SIR to a TPC generator 234. TPC generator 234 also receives the SIR target for wireless device 120, compares the received SIR against the SIR target, and generates TPC commands based on the comparison results. Each TPC command is either (1) an UP command to direct an increase in transmit power for the uplink transmission or (2) a DOWN command to direct a decrease in transmit power. For W-CDMA, one TPC command is generated for each slot (which has a duration of 666.67 μsec) and is sent on the downlink (cloud 250) to wireless device 120.

Wireless device 120 receives and processes the downlink transmissions from the base stations in the active set. For each slot, a TPC processor 252 obtains a received TPC command for each base station in the active set. A "received" TPC command is a noisy version of a TPC command sent by a base station (due to channel noise, receiver noise, and so on). For each slot, TPC processor 252 detects and combines received TPC commands for all base stations in the active set and obtains a single "TPC decision" for that slot. The TPC decision may be an UP decision, a DOWN decision, or a no-OP decision. A transmit (TX) power adjustment unit 254 then adjusts the transmit power for the uplink transmission based on the TPC decisions from TPC processor 252. Unit 254 increases the transmit power by $\Delta TX_{up}$ for each UP decision, decreases the transmit power by $\Delta TX_{dn}$ for each DOWN decision, and maintains the transmit power at the same level for each no-OP decision. $\Delta TX_{dn}$ and $\Delta TX_{up}$ may both be set equal to 1.0 dB, 2.0 dB, or some other value. For W-CDMA, TPC commands may be sent as often as 1500 times per second, thereby providing a relatively fast response time for inner loop 210.

Due to path loss, fading, and multipath effects on the uplink (cloud 230), which typically vary over time, particularly for a mobile wireless device, the received SIR at each base station continually fluctuates. Inner loop 210 for each base station attempts to maintain the received SIR for wireless device 120 at or near the SIR target in the presence of changes in the uplink channel.

Outer loop 220 continually adjusts the SIR target such that the BLER target is achieved for the uplink transmission. A single outer loop 220 may be maintained for wireless device 120 by system controller 130. The uplink transmission from wireless device 120 is received by each base station in the active set. A receive (RX) data processor 242 at each base station processes and decodes each received data block in the uplink transmission to obtain a corresponding decoded data block. A received data block (or received block) is a block of data received for a transmission and may be for a transmitted data block or a discontinuous transmission (DTX) block, which is a non-transmitted or null block. RX data processor 242 also determines the status of each decoded data block, which may be (1) "good" to indicate that a data block was transmitted and decoded correctly, (2) "bad" or "erased" to indicate that a data block was deemed to have been transmitted but decoded in error, or (3) "DTX" to indicate that no data block was deemed to have been transmitted by the wireless device. RX data processor 242 at each base station sends good decoded data blocks and the status of each decoded data block (good, erased, or DTX) to system controller 130.

System controller 130 selects and/or combines the decoded data blocks received from the base stations in the active set. An SIR target adjustment unit 244 at system controller 130 receives the block status from the base stations and adjusts the SIR target for wireless device 120. If a data block is decoded correctly, then the received SIR for wireless device 120 is likely to be higher than necessary, and unit 244 reduces the SIR target slightly. Conversely, if a data block is decoded in error, then the received SIR for wireless device 120 is likely to be lower than necessary, and unit 244 increases the SIR target. Unit 244 may maintain the SIR target at the same level if no data blocks are transmitted by wireless device 120.

Spikes in transmit power may occur for various reasons. For example, transmit power spikes may randomly occur in both upward and downward directions due to erroneous detection of TPC commands at the wireless device, bad received SIR measurements at the base stations, and so on. Transmit power spikes may also systematically occur due to certain operating scenarios. For example, the wireless device may be in soft handover, and the uplink may go out-of-sync at one of the base stations in the active set. This base station may then send all UP commands to the wireless device. The wireless device may give TPC commands from this base station more weight, e.g., because the wireless device measures the highest received SIR or the strongest pilot strength for this base station. In this case, the wireless device may respond largely or solely to the UP commands sent by this base station, and an upward transmit power spike may occur. The out-of-sync condition may persist for an extended period of time (e.g., on the order of 100 msec), and the excess transmit power used for uplink transmission due to the spike may significantly degrade system performance.

The spike mitigation techniques described herein can reduce the magnitude and/or the duration of systematic upward transmit power spikes as well as random upward and downward transmit power spikes. The techniques also allow the transmit power to be adjusted back to the proper or nominal level as rapidly as possible after detection of a transmit power spike. The techniques also allow the inner loop to quickly adjust the transmit power due to rapidly changing channel conditions.

Figure 3:
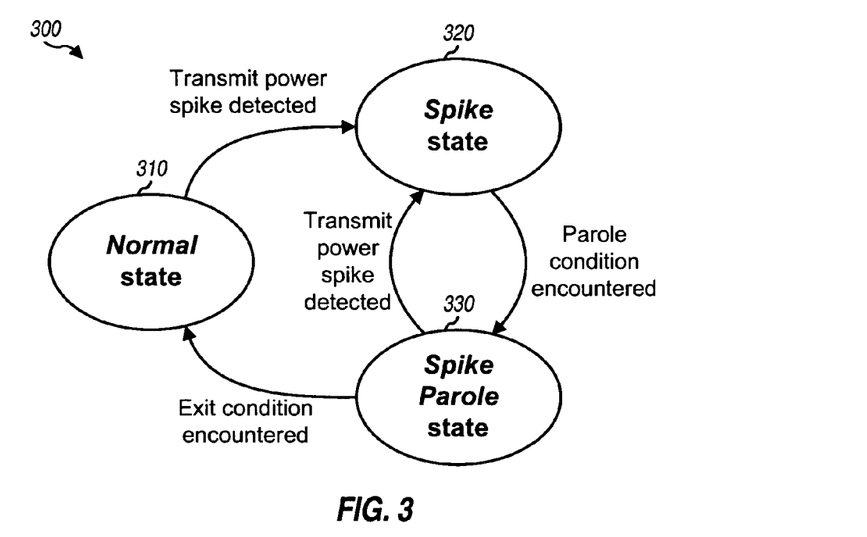
FIG. 3 shows a state diagram for an embodiment of spike mitigation.

FIG. 3 shows a state diagram 300 for an embodiment of spike mitigation. This embodiment mitigates transmit power spikes in a direction of interest, either upward or downward, and may be implemented within TPC processor 252 in FIG. 2.

Initially, at the start of a call, TPC processor 252 transitions to a Normal state 310. In state 310, TPC processor 252 performs power control in the normal manner and in accordance with a TPC scheme used for this state. The power control processing may include detecting and combining received TPC commands for all base stations in the active set, generating TPC decisions, and adjusting the transmit power. If a transmit power spike in the direction to be mitigated (e.g., upward) is detected while in state 310, then TPC processor 252 transitions to a Spike state 320. In state 320, TPC processor 252 performs power control in a manner to mitigate the adverse effects of the transmit power spike and in accordance with a TPC scheme used for this state. If a "parole" condition is encountered while in state 320, then TPC processor 252 transitions to a Spike Parole state 330, which is a temporary/transitory state between states 320 and 310. State 330 may be used to quickly detect for another transmit power spike, to allow the transmit power to return to the nominal level, and so on. State 330 may also be omitted. In state 330, TPC processor 252 performs power control in accordance with a TPC scheme used for this state. From state 330, TPC processor 252 (1) returns to Spike state 320 if another transmit power spike in the direction to be mitigated is detected and (2) transitions to Normal state 310 if an "exit" condition is encountered. The TPC schemes, detection of spikes, and parole and exit conditions are described below.

A spike in transmit power may be detected in various manners. In one embodiment, a transmit power spike in a direction of interest (e.g., upward) is detected if a predetermined number of ($N_c$) consecutive TPC decisions is obtained for adjusting the transmit power in this direction. $N_c$ may be set to any value such as, for example, 5, 8, 10, and so on. A smaller value for $N_c$ can allow for detection of smaller magnitude spikes and for quicker detection of spikes. However, a smaller value for $N_c$ can also result in a greater likelihood of false detection, or falsely detecting a valid rapid adjustment of transmit power (e.g., due to deteriorating channel condition) as a spike. The converse is generally true for a larger value for $N_c$. $N_c=7$ has been found to provide good spike detection performance. In another embodiment, a transmit power spike is detected if $N_c$ out of the last $N_{total}$ TPC decisions are in the direction of interest. This embodiment may provide better spike detection performance in a noisy environment, where received TPC commands may be detected in error and cause errors in TPC decisions. In yet another embodiment, a transmit power spike is detected if the transmit power level is changed in the direction of interest by a predetermined amount or more within a predetermined time window. A transmit power spike may also be detected based on other criteria.

The same criterion may be used to detect for transmit power spikes in Normal state 310 and Spike Parole state 330. For example, a transmit power spike may be detected in both states 310 and 330 with $N_c=5$ consecutive TPC decisions in the direction of interest. Alternatively, different criteria may be used to detect for transmit power spikes in states 310 and 330. For example, a spike may be detected in state 310 with $N_{c,N}=5$ consecutive TPC commands in the direction of interest and in state 330 with $N_{c,P}=4$ consecutive TPC commands in the direction of interest.

Various conditions may be used to transition from Spike state 320 to Spike Parole state 330 and from state 330 to Normal state 310. In an embodiment, the parole condition to transition from Spike state 320 to Spike Parole state 330 is encountered if a predetermined amount of time, $T_{parole}$, has elapsed since entering Spike state 320. $T_{parole}$ may be set to any time duration such as, for example, 30 slots, 45 slots, 60 slots, and so on. A larger value for $T_{parole}$ results in a longer stay in Spike state 320, which may restrict the adjustment of transmit power. In another embodiment, the parole condition is encountered if the transmit power level falls below a predetermined level. In yet another embodiment, the parole condition is encountered if the ratio of the number of UP decisions to the total number of TPC decisions obtained in Spike state 320 is below a predetermined threshold.

In an embodiment, the exit condition to transition from Spike Parole state 330 to Normal state 310 is encountered if a predetermined amount of time, $T_{exit}$, has elapsed since entering Spike Parole state 330. $T_{exit}$ may also be set to any time duration such as, for example, 20 frames, 30 frames, 40 frames, and so on. A larger value for $T_{exit}$ results in a longer delay for the return to Normal state 310. In another embodiment, the exit condition is determined based on the transmit power level. In yet another embodiment, the exit condition is determined based on the number of UP decisions and the total number of TPC decisions obtained in Spike Parole state 330.

Various TPC schemes may be used for power control. In a first TPC scheme, TPC decisions are generated based on an "OR-of-the-DOWN" rule. For each slot, received TPC commands for all base stations in the active set are obtained, and the received TPC command for each base station is detected to determine whether that received TPC command is an UP command, a DOWN command, or a rejected command. A received TPC command that is not transmitted or is deemed unreliable (e.g., because of noise) may be discarded from use and considered as a rejected command. The TPC decision for each slot is (1) a DOWN decision if at least one DOWN command is detected for the slot, (2) an UP decision if at least one UP command and no DOWN commands are detected for the slot, or (3) a no-OP decision if only rejected commands are detected for the slot. In a second TPC scheme, TPC decisions are set equal to the detected TPC commands for the "best" base station, which is the base station in the active set with the best received SIR or the strongest pilot strength. For both TPC schemes, the transmit power is adjusted based on the TPC decisions, as described above for FIG. 2. The first, second or some other TPC scheme may be used for each of Normal state 310 and Spike Parole state 330.

In a third TPC scheme, TPC decisions are generated and used to adjust the transmit power (e.g., in the same manner as in Normal state 310) but the transmit power is limited to be within a predetermined transmit power level. This scheme allows power control to be performed in the normal manner but limits the magnitude of the transmit power spikes. For example, to mitigate upward spikes in Spike state 320, a maximum transmit power level, $TX_{limit}$, may be computed as: $TX_{limit} = TX_{in} + TX_{delta}$, where $TX_{in}$ is the initial transmit power level at the time of transition into state 320 and $TX_{delta}$ is the amount of change in transmit power level allowed for state 320. The transmit power is then restricted to be at or below this maximum transmit power level. $TX_{delta}$ may be a positive or negative value. A positive value for $TX_{delta}$ allows the transmit power to be adjusted higher than the initial transmit power level. A negative value for $TX_{delta}$ reduces the transmit power upon entering the state, which may be beneficial if the transmit power level is higher than needed due to the detected upward spike. In general, a lower or more negative value for $TX_{delta}$ corresponds to a more aggressive mitigation action against upward spikes. To mitigate downward spikes, a minimum transmit power level may be computed in a similar manner, and the transmit power may be restricted to be at or above this minimum transmit power level.

In a fourth TPC scheme, the transmit power is adjusted by a smaller than normal amount for each TPC decision in the direction of the spike. For example, to mitigate upward spikes, the transmit power may be adjusted by $\Delta TX_{up} = 1.0$ dB for each UP decision in Normal state 310 and by $\Delta TX_{up,spike} = 0.5$ dB for each UP decision in Spike state 320. In a fifth TPC scheme, the detected TPC commands for each base station in the active set and/or the TPC decisions for all base stations are delayed and/or filtered to obtain final TPC decisions, which are then used to adjust the transmit power. In a sixth TPC scheme, TPC decisions for adjusting the transmit power in the direction of the spike are discarded and only TPC decisions in the other direction are processed. This processing may be imposed for either a short amount of time upon entering a state or the entire time in the state. Any one of the third through sixth TPC schemes, or some other TPC scheme, may be used for each of Spike state 320 and Spike Parole state 330.

In general, various TPC schemes may be used to generate TPC decisions based on received TPC commands and to adjust the transmit power based on the TPC decisions. Some exemplary TPC schemes are described above. Different behaviors for power control and spike mitigation may be achieved by generating TPC decisions and/or adjusting transmit power in different manners, some of which are described above.

For clarity, a specific embodiment of spike mitigation is described below. For this embodiment, a transmit power spike in a direction of interest (e.g., upward) is detected while in Normal state 310 if $N_{c,N}$ consecutive TPC decisions are in the direction of interest, and a transmit power spike is detected while in Spike Parole state 330 if $N_{c,P}$ consecutive TPC decisions are in the direction of interest. A transition from Spike state 320 to Spike Parole state 330 occurs after $T_{parole}$ seconds in state 320, and a transition from Spike Parole state 330 to Normal state 310 occurs after $T_{exit}$ seconds in state 330. The transmit power is limited while in Spike state 320. Table 1 lists the parameters for this embodiment and exemplary values for these parameters.

TABLE 1

| Parameter | Description | Value |
|---|---|---|
| $N_{c,N}$ | Number of consecutive TPC decisions, in the direction of interest, to detect for a transmit power spike while in Normal state 310 | 7 decisions |
| $N_{c,P}$ | Number of consecutive TPC decisions, in the direction of interest, to detect for a transmit power spike while in Spike Parole state 330 | 7 decisions |
| $T_{parole}$ | Amount of time in Spike state 320 | 45 slots |
| $T_{exit}$ | Maximum amount of time in Spike Parole state 330 | 30 slots |
| $TX_{delta}$ | Delta applied to initial Spike state 320 transmit power to obtain maximum power limit while in this state. | −2 dB |

Table 2 lists some variables used to implement the specific spike mitigation embodiment.

TABLE 2

| Variable | Description | Initial Value |
|---|---|---|
| State | Indicate the current state | 'Normal' |
| $t_{elapsed}$ | Timer for amount of elapsed time in the current state | 0 slots |
| $n_c$ | Counter for the number of consecutive TPC decisions in the direction of interest | 0 |
| $TX_{limit}$ | Transmit power limit for the current state | — |
| $TX(i)$ | Transmit power for current slot i | — |

Figure 4:
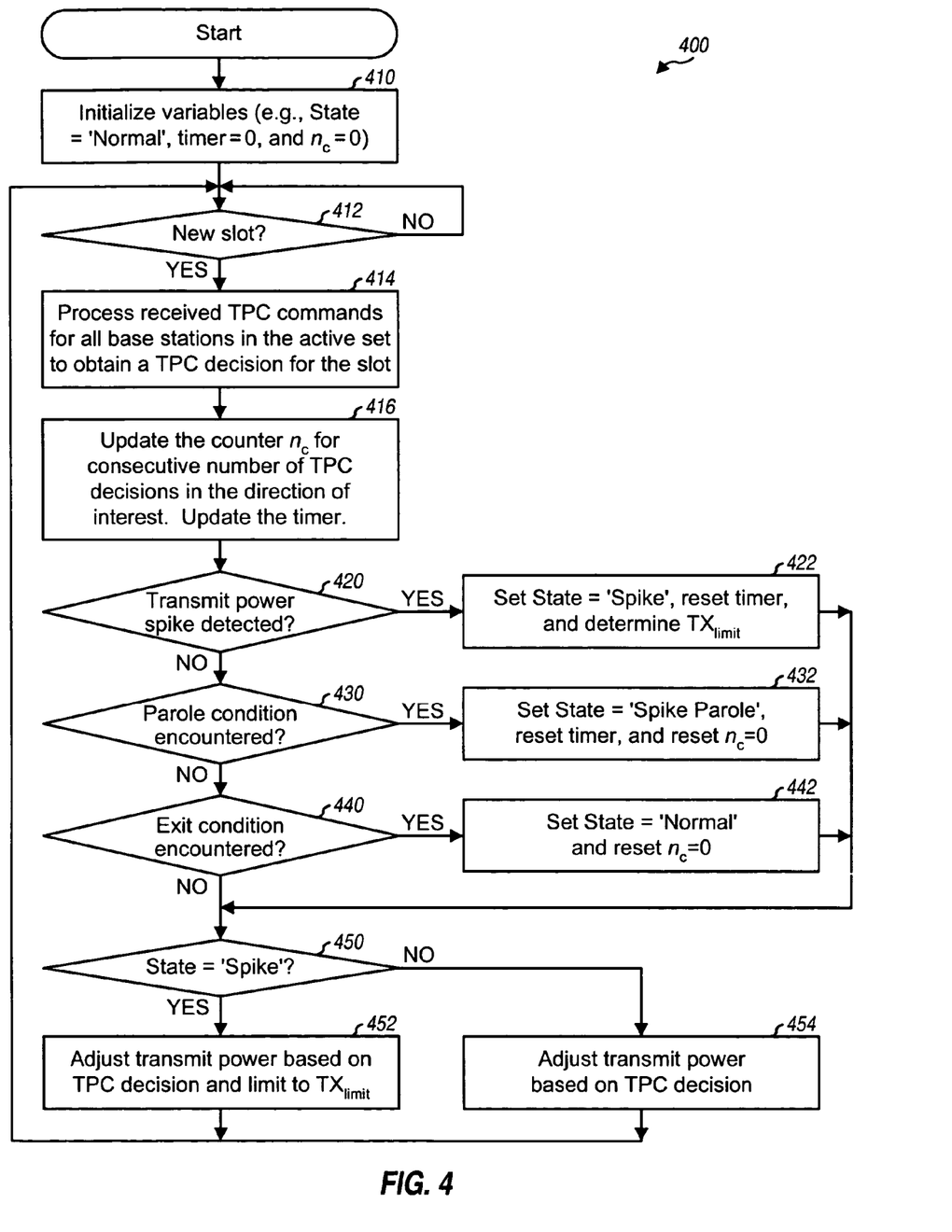
FIG. 4 shows a process for performing power control in conjunction with the spike mitigation embodiment in FIG. 3.

FIG. 4 shows a flow diagram of a process 400 for performing power control in conjunction with the spike mitigation embodiment in FIG. 3. At the start of a call, the pertinent variables are initialized, e.g., as shown in Table 2 (block 410). For upward spike mitigation, the transmit power limit, $TX_{limit}$, may be set to the maximum transmit power level allowed for the wireless device, which may be set by either the system or the CDMA standard implemented by the system. The current transmit power, $TX(i)$, may be set based on a procedure defined by the CDMA standard.

For each new slot (or each transmit power adjustment interval), as determined in block 412, received TPC commands for all base stations in the active set are processed to obtain a TPC decision for the slot (block 414). This processing may be based on the first or second TPC scheme described above, or some other TPC scheme. The counter $n_c$ for the number of consecutive TPC decisions in the direction of interest is updated (e.g., reset, incremented, or maintained) based on the TPC decision obtained for the current slot (block 416). The timer may also be updated (e.g., incremented by one slot) if required for the current state (also in block 416).

A determination is then made whether a transmit power spike in the direction of interest has been detected (block 420). The answer is 'yes' if either (1) State ='Normal' and $n_c=N_{c,N}$ or (2) State ="Spike" and $n_c=N_{c,P}$. If a transmit power spike has been detected, then the variables are re-initialized for a transition to Spike state 320 (block 422). This may include setting State to "Spike", resetting the timer to zero, and computing the transmit power limit for Spike state 320 as $TX_{limit}=TX(i)+TX_{delta}$. The process then proceeds to block 450.

If the answer is 'no' for block 420, then a determination is made whether the parole condition has been encountered (block 430). The answer is 'yes' for block 430 if State='Spike' and the timer has elapsed (or $t_{elapsed}=T_{parole}$). In this case, the variables are re-initialized for a transition to Spike Parole state 330 (block 432). This may include setting State to 'Spike Parole', resetting the timer to zero, and resetting the counter $n_c$ to zero. The process then proceeds to block 450.

If the answer is 'no' for block 430, then a determination is made whether the exit condition has been encountered (block 440). The answer is 'yes' for block 440 if State ='Spike Parole' and the timer has elapsed (or $t_{elapsed}=T_{exit}$). In this case, the variables are re-initialized for a transition to Normal state 310 (block 442). This may include setting State to 'Normal' and resetting the counter $n_c$ to zero. From block 442, and if the answer is 'no' for block 440, the process proceeds to block 450.

In block 450, a determination is made whether the current state is Spike state 320. If the answer is 'yes', then the transmit power TX(i) is adjusted based on the TPC decision for the current slot and further limited to the transmit power limit, $TX_{limit}$. The transmit power is restricted to be (1) at or below $TX_{limit}$ to mitigate an upward spike or (2) at or above $TX_{limit}$ to mitigate a downward spike. The transmit power limit, $TX_{limit}$, is applicable to Spike state 320, and other minimum and maximum power limits for the wireless device may also be applicable for all states. If the answer is 'no' for block 450, then the transmit power is adjusted based on the TPC decision for the current slot and not limited. The process then returns to block 412 to process the next slot.

In FIG. 4, block 416 updates the variables used to detect for a transmit power spike and to detect for transitions between states. Blocks 420 through 442 detect for transitions between states and re-initialize the appropriate variables. Blocks 450 through 454 adjust the transmit power based on the TPC decision for the current slot and in accordance with the TPC schemes selected for use. For the embodiment shown in FIG. 4, the same TPC scheme is used for Normal state 310 and Spike Parole state 330. In general, each state uses a TPC scheme that may be the same as or different from the ones used for the other states.

As noted above, the techniques described herein may be used to mitigate only upward transmit power spikes, only downward transmit power spikes, or both upward and downward spikes. Upward spikes may be deemed to be more detrimental since they negatively impact the uplink capacity as well as the performance of other wireless devices. Downward spikes may be deemed to be less detrimental since they degrade the performance of only the affected wireless device. Spike mitigation may thus be tailored to combat the more detrimental upward spikes.

Figure 5:
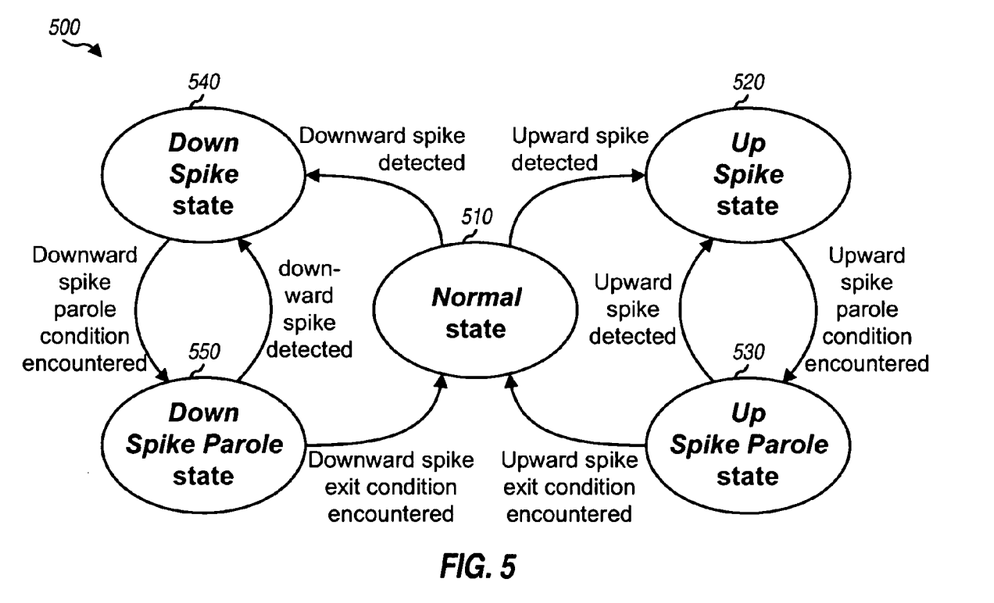
FIG. 5 shows a state diagram for another embodiment of spike mitigation.

FIG. 5 shows a state diagram 500 for another embodiment of spike mitigation. This embodiment mitigates upward transmit power spikes and, depending on the TPC schemes selected for use, may or may not mitigate downward transmit power spikes. This embodiment may also be implemented within TPC processor 252 in FIG. 2. Initially, at the start of a call, TPC processor 252 transitions to a Normal state 510 and performs power control (e.g., processes received TPC commands from all base stations in the active set, generates TPC decisions, and adjusts the transmit power) in accordance with a TPC scheme used for this state.

If an upward transmit power spike is detected while in Normal state 510, then TPC processor 252 transitions to an Up Spike state 520. In state 520, TPC processor 252 performs power control in a manner to mitigate the adverse effects of the upward transmit power spike and in accordance with a TPC scheme used for this state. If an upward spike parole condition is encountered while in state 520, then TPC processor 252 transitions to an Up Spike Parole state 530 and performs power control in accordance with a TPC scheme used for this state. From state 530, TPC processor 252 (1) returns to Up Spike state 520 if another upward transmit power spike is detected and (2) transitions to Normal state 510 if an upward spike exit condition is encountered.

If a downward transmit power spike is detected while in Normal state 510, then TPC processor 252 transitions to a Down Spike state 540. In state 540, TPC processor 252 may perform power control in the same manner as in Normal state 510 or in a manner to mitigate the adverse effects of the downward spike. If a downward spike parole condition is encountered while in state 540, then TPC processor 252 transitions to a Down Spike Parole state 550 and performs power control in accordance with a TPC scheme used for this state. From state 550, TPC processor 252 (1) returns to Down Spike state 540 if another downward transmit power spike is detected and (2) transitions to Normal state 510 if a downward spike exit condition is encountered.

An upward spike or a downward spike in transmit power may be detected in various manners, as described above. For example, an upward transmit power spike may be detected if (1) a predetermined number of ($N_{up}$) consecutive UP decisions is obtained, (2) $N_{up}$ out of the last $N_{total}$ TPC decisions are UP decisions, (3) the transmit power level is increased by a predetermined amount or more within a predetermined time window, and so on.

Various TPC schemes may be used for each of the states shown in FIG. 5. For example, a spike in the upward or downward direction may be mitigated by limiting the transmit power, reducing the rate at which the transmit power may be adjusted, delaying and/or filtering TPC decisions used to adjust the transmit power, preventing adjustment of the transmit power in the direction of the spike, and so on. To mitigate only upward transmit power spikes, the same TPC scheme may be used for states 510, 530, 540, and 550, and a TPC scheme that mitigates upward spikes may be used for state 520. To mitigate only downward transmit power spikes, the same TPC scheme may be used for states 510, 520, 530, and 550, and a TPC scheme that mitigates downward spikes may be used for state 540. To mitigate both upward and downward transmit power spikes, the same TPC scheme may be used for states 510, 530, and 550, a TPC scheme that mitigates upward spikes may be used for state 520, and a TPC scheme that mitigates downward spikes may be used for state 540.

The embodiment shown in FIG. 5 allows a transmit power spike in one direction (e.g., upward) to occur without mitigation action after a transmit power spike in the other direction (e.g., downward) has been detected. TPC processor 252 transitions from Normal state 510 to Down Spike state 540 if a downward transmit power spike is detected. While in states 540 and 550, an upward transmit power spike does not cause a transition to Up Spike state 520 and can thus occur without mitigation action. Similarly, TPC processor 252 transitions from Normal state 510 to Up Spike state 520 if an upward transmit power spike is detected. While in states 520 and 530, a downward transmit power spike does not cause a transition to Down Spike state 540 and can occur without mitigation efforts. This embodiment allows the transmit power to rapidly return to the nominal level, after a spike has been detected, by not penalizing TPC decisions in the direction opposite of the detected spike.

For clarity, another specific embodiment of spike mitigation is described below.

Table 3 lists the parameters for this embodiment and exemplary values for these parameters. Other values may also be used for the parameters in Table 3. The variables shown in Table 2 may also be used for this embodiment, with the addition of a variable $n_{dn}$ for the number of consecutive DOWN decisions.

TABLE 3

| Parameter | Description | Value |
|---|---|---|
| $N_{up,N}$ | Number of consecutive UP decisions to detect for an upward transmit power spike while in Normal state 510 | 7 UP decisions |
| $N_{up,P}$ | Number of consecutive UP decisions to detect for an upward spike while in Up Spike Parole state 530 | 7 UP decisions |
| $N_{dn,N}$ | Number of consecutive DOWN decisions to detect for a downward transmit power spike while in Normal state 510 | 6 DOWN decisions |
| $N_{dn,P}$ | Number of consecutive DOWN decisions to detect for a downward spike while in Down Spike Parole state 550 | 6 DOWN decisions |
| $T_{up\_parole}$ | Amount of time in Up Spike state 520 | 45 slots |
| $T_{up\_exit}$ | Amount of time in Up Spike Parole state 530 | 30 slots |
| $T_{dn\_parole}$ | Amount of time in Down Spike state 540 | 45 slots |
| $T_{dn\_exit}$ | Amount of time in Down Spike Parole state 550 | 30 slots |
| $T_{delta}$ | Maximum allowed change in transmit power level | −2 dB |

Figure 6A:
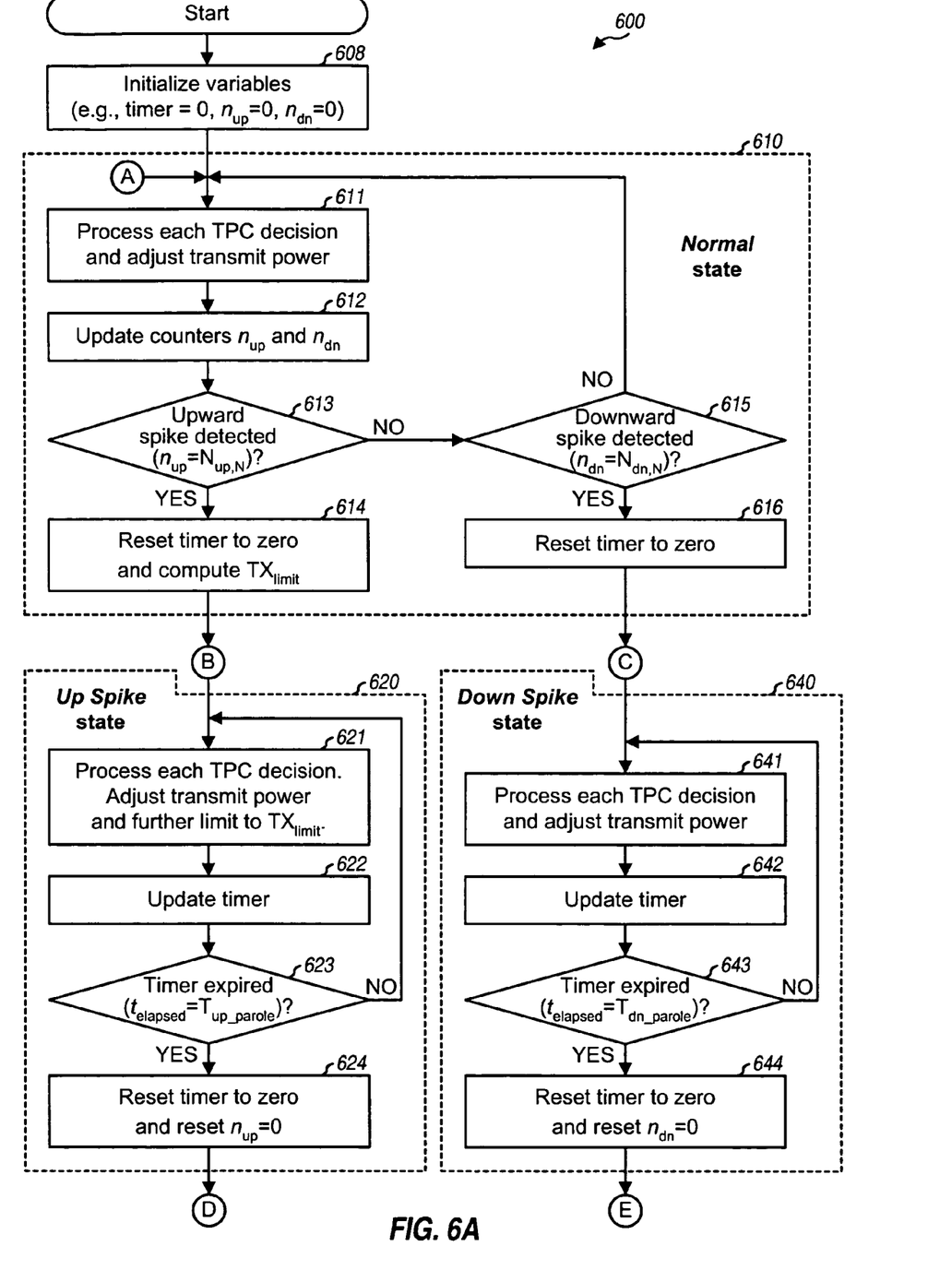
FIGS. 6A and 6B show a process for performing power control in conjunction with the spike mitigation embodiment in FIG. 5.
Figure 6B:
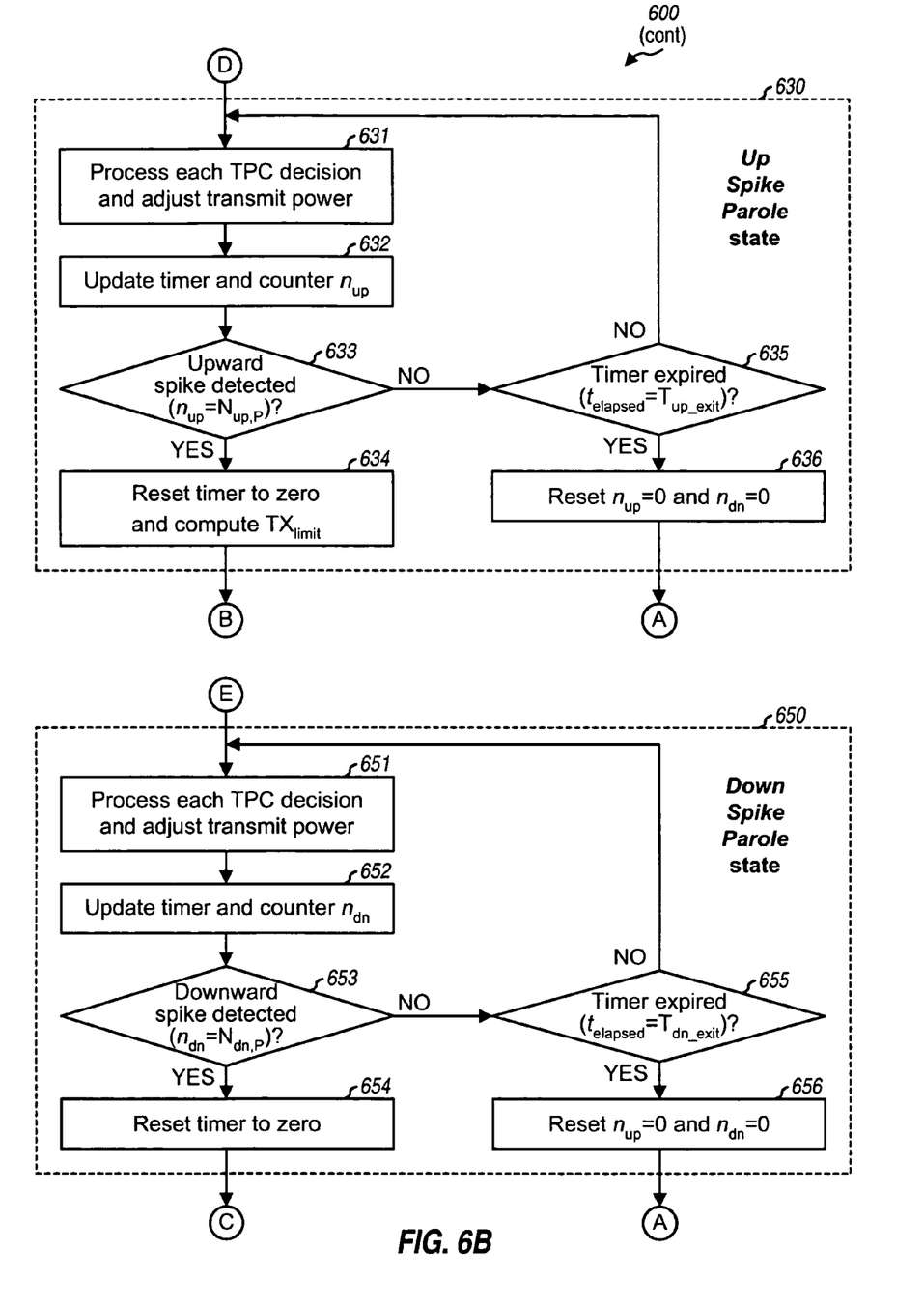

FIGS. 6A and 6B show a flow diagram of a process 600 for performing power control in conjunction with the spike mitigation embodiment in FIG. 5. For process 600, sections 610, 620, 630, 640, and 650 perform power control for Normal state 510, Up Spike state 520, Up Spike Parole state 530, Down Spike state 540, and Down Spike Parole state 550, respectively. The variables are initialized at the start of a call, e.g., State='Normal', $t_{elapsed}$=0, $n_{up}$=0, $n_{dn}$=0 (block 608). The process then transitions to section 610 for Normal state 510.

In Normal state 510 (section 610), the TPC decision for each slot is processed and the transmit power is adjusted accordingly (block 611). The counter $n_{up}$ for the number of consecutive UP decisions and the counter $n_{dn}$ for the number of consecutive DOWN decisions are also updated in each slot based on the TPC decision for that slot (block 612). If an upward transmit power spike is detected (e.g., $n_{up}$=$N_{up,N}$), as determined in block 613, then the variables are re-initialized for a transition to Up Spike state 520 (block 614). This may include resetting the timer to zero and computing the maximum transmit power for Up Spike state 520 as $TX_{limit}$=$TX(i)$+$TX_{delta}$. The process then proceeds to block 621 within section 620. If the answer is 'no' for block 613 and if a downward transmit power spike is detected (e.g., $n_{dn}$=$N_{dn,N}$) in block 615, then the variables are re-initialized for a transition to Down Spike state 540 (block 616). This may include resetting the timer to zero. The process then proceeds to block 641 within section 640.

In Up Spike state 520 (section 620), the TPC decision for each slot is processed, and the transmit power is adjusted accordingly and is further limited to $TX_{limit}$ (block 621). The timer is also updated (e.g., incremented) in each slot (block 622). If the timer has not expired (e.g., $t_{elapsed}$<$T_{up\_parole}$), as determined in block 623, then the process returns to block 621. Otherwise, the variables are re-initialized for a transition to Up Spike Parole state 530 (block 624). This may include resetting the timer to zero. The counter $n_{up}$ may or may not be reset to zero prior to the transition to Up Spike Parole state 530. The process then proceeds to block 631 within section 630.

In Up Spike Parole state 530 (section 630 in FIG. 6B), the TPC decision for each slot is processed, and the transmit power is adjusted accordingly but not limited for this embodiment (block 631). In each slot, the timer is updated (e.g., incremented) and the counter $n_{up}$ is also updated based on the TPC decision for that slot (block 632). If an upward transmit power spike is detected (e.g., $n_{up}$=$N_{up,P}$), as determined in block 633, then the variables are re-initialized for a transition to Up Spike state 520 (block 634). This may include resetting the timer to zero and computing $TX_{limit}$ as $TX_{limit}$=$TX(i)$+$TX_{delta}$. The process then proceeds to block 621 within section 620. If the answer is 'no' for block 633, and if the timer has not expired (e.g., $t_{elapsed}$<$T_{up\_exit}$) as determined in block 635, then the process returns to block 631. Otherwise, the variables are re-initialized for a transition to Normal state 510, e.g., by resetting both counters $n_{up}$ and $n_{up}$ to zero (block 636). The process then proceeds to block 611 within section 610.

In Down Spike state 540 (section 640 in FIG. 6A), the TPC decision for each slot is processed, and the transmit power is adjusted accordingly but not limited for this embodiment (block 641). The timer is also updated in each slot (block 642). If the timer has not expired (e.g., $t_{elapsed}$<$T_{dn\_parole}$), as determined in block 643, then the process returns to block 641. Otherwise, the variables are re-initialized for a transition to Down Spike Parole state 550 (block 644). This may include resetting the timer to zero. The counter $n_{dn}$ may or may not be reset to zero prior to the transition to Down Spike Parole state 550. The process then proceeds to block 651 within section 650.

In Down Spike Parole state 550 (section 650 in FIG. 6B), the TPC decision for each slot is processed, and the transmit power is adjusted accordingly and not limited (block 651). In each slot, the timer is updated and the counter $n_{dn}$ is also updated based on the TPC decision for the slot (block 652). If a downward transmit power spike is detected (e.g., $n_{dn} = N_{dn,P}$), as determined in block 653, then the variables are re-initialized for a transition to Down Spike state 540 (block 654). This may include resetting the timer to zero. The process then proceeds to block 641 within section 640. If the answer is 'no' for block 653, and if the timer has not expired (e.g., $t_{elapsed} < T_{dn\_exit}$) as determined in block 655, then the process returns to block 651. Otherwise, the variables are re-initialized for a transition to Normal state 510, e.g., by resetting both counters $n_{up}$ and $n_{dn}$ to zero (block 656). The process then proceeds to block 611 within section 610.

In FIG. 4 and FIGS. 6A and 6B, the timer may be updated in each slot while in states 520, 530, 540, and 550, and the counters $n_{up}$ and/or $n_{dn}$ may be updated in each slot while in states 510, 530, and 550. The timer and/or counters may also be updated in other manners, e.g., for different operating scenarios. In one scenario, a gap in transmission may occur in a compressed mode in W-CDMA. This transmission gap allows the wireless device to measure other frequencies, and no data and no TPC commands are transmitted by the base stations during the transmission gap. The counters $n_{up}$ and $n_{dn}$ may be maintained at the same values (i.e., not updated) during transmission gaps. In another scenario, for a no-OP decision, which may be generated if the received TPC commands are not transmitted by the base stations or are deemed to be unreliable by the wireless device, the counters $n_{up}$ and $n_{dn}$ may also be maintained at the same values. In yet another scenario, if the transmit power is at the maximum level allowed for the wireless device, then UP decisions are ignored and the counter $n_{up}$ may be maintained. Correspondingly, if the transmit power is at the minimum level allowed for the wireless device, then DOWN decisions are ignored and the counter $n_{dn}$ may be maintained. For all of the above scenarios, the timer may be updated in the normal manner so that the length of time spent in the Spike state or the Spike Parole state remains the same. The counters and timer may also be updated in other manners.

FIGS. 3 and 5 show two state diagrams for two exemplary spike mitigation embodiments. In general, spike mitigation may be implemented with any number of states. One state may be used to adjust the transmit power in the normal manner, and another state may be used to adjust the transmit power in a manner to mitigate the adverse effects of transmit power spikes. The parole states may or may not be used depending on the desired behavior. Up Spike Parole state 530 and Down Spike Parole state 550 may also be combined into a single Spike Parole state that maintains, at any given moment, (1) either the counter $n_{up}$ or $n_{up}$ and (2) the timer for either upward or downward spike.

FIG. 4 and FIGS. 6A and 6B show two flow diagrams for the two exemplary spike mitigation embodiments. In FIG. 4, a variable State is used to keep track of the current state. In FIG. 6, different sections 610, 620, 630, 640, and 650 are used for different states. In general, the states and the processing for each state may be implemented in various manners, as is known by one skilled in the art.

Figure 7:
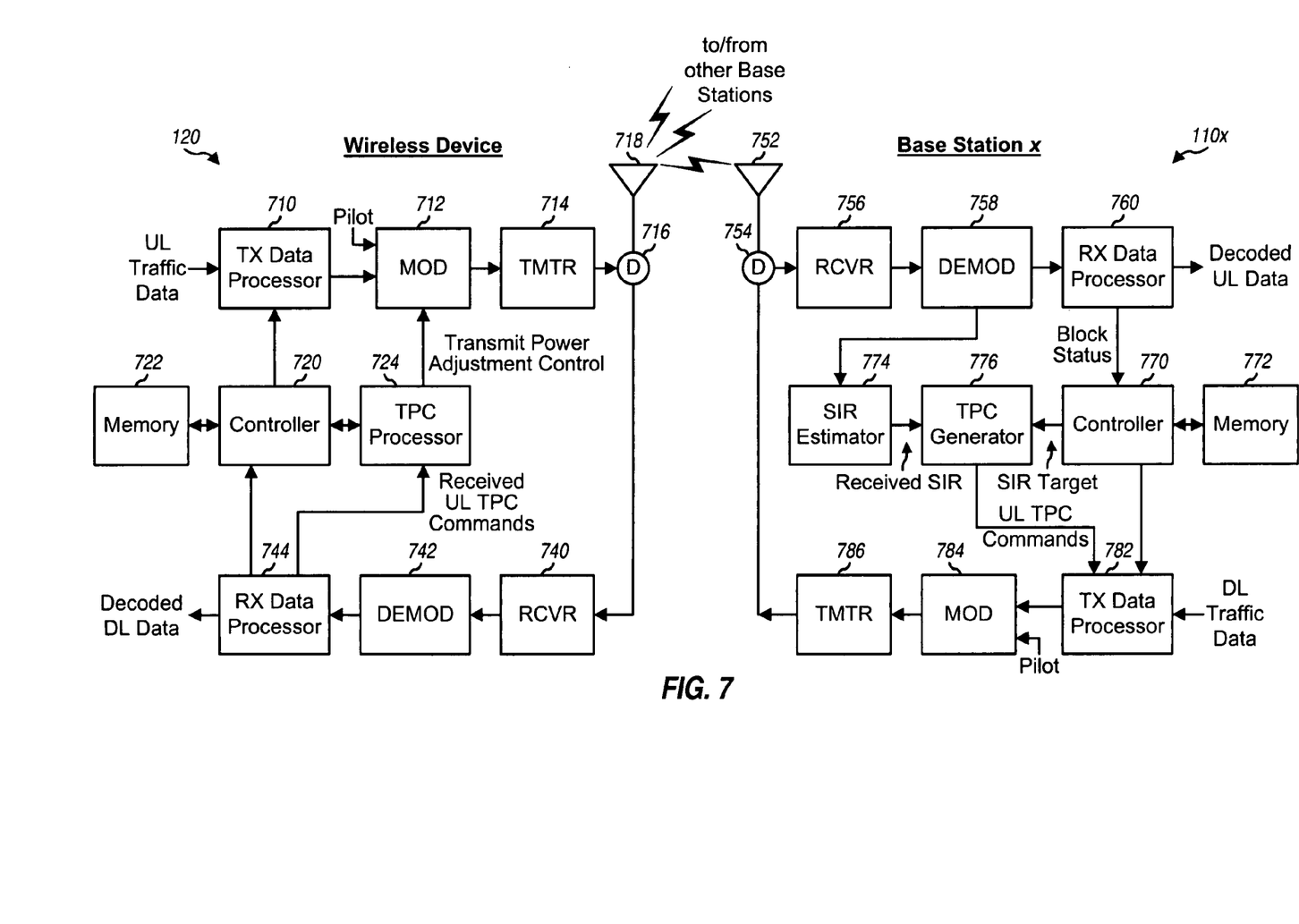
FIG. 7 shows a block diagram of a base station and a wireless device.

FIG. 7 shows a block diagram of an embodiment of a base station 110x and wireless device 120. Base station 110x is one of the base stations in the active set of wireless device 120. On the uplink, at wireless device 120, a transmit (TX) data processor 710 receives, formats, codes, interleaves, and modulates uplink (UL) traffic data and provides data symbols, which are modulation symbols for data. A modulator (MOD) 712 processes the data symbols and pilot symbols and provides a sequence of complex-valued chips. For W-CDMA, the processing by modulator 712 includes (1) channelizing (or "spreading") the data symbols for each physical channel with an orthogonal variable spreading factor (OVSF) code assigned to that physical channel, (2) scaling the channelized data for each physical channel based on a transmit power adjustment control for that physical channel, (3) combining the scaled data for all physical channels, and (4) spectrally spreading (or "scrambling") the combined data with a scrambling sequence to obtain the sequence of chips. A transmitter unit (TMTR) 714 conditions (e.g., converts to analog, amplifies, filters, and frequency upconverts) the sequence of chips to generate an uplink signal, which is routed through a duplexer (D) 716 and transmitted via an antenna 718.

At base station 110x, the uplink signal from wireless device 120 is received by an antenna 752, routed through a duplexer 754, and provided to a receiver unit (RCVR) 756. Receiver unit 756 conditions (e.g., filters, amplifies, and frequency downconverts) the received signal and further digitizes the conditioned signal to obtain a stream of data samples. A demodulator (DEMOD) 758, which may implement a rake receiver, processes the data samples to obtain data symbol estimates. For W-CDMA, the processing by demodulator 758 includes (1) descrambling the data samples with a descrambling sequence, (2) dechannelizing the descrambled samples with OVSF codes to segregate the received data onto their respective physical channels, and (3) coherently demodulating the received data for each physical channel with pilot estimates to obtain the data symbol estimates. A receive (RX) data processor 760 then deinterleaves and decodes the data symbol estimates to obtain decoded data for wireless device 120. RX data processor 760 further checks each decoded data block and provides the status of the block (e.g., good, erased, or DTX) to a controller 770.

The processing for a downlink transmission may be performed similarly to that described above for the uplink. The uplink and downlink processing for W-CDMA is described in documents 3GPP TS 25.211, 25.212, 25.213, and 25.214, all of which are publicly available. The processing for uplink and downlink transmissions for other CDMA and TDMA systems is described in the applicable standards implemented by these systems.

For uplink power control, an SIR estimator 774 estimates the received SIR for wireless device 120 (e.g., based on pilot symbols received from the wireless device) and provides the received SIR to a TPC generator 776. TPC generator 776 also receives the SIR target for wireless device 120 (e.g., from system controller 130) and generates TPC commands for wireless device 120 based on the received SIR and the SIR target. The TPC commands are processed by a TX data processor 782, further processed by a modulator 784, conditioned by a transmitter unit 786, routed through duplexer 754, and transmitted via antenna 752 to wireless device 120.

At wireless device 120, the downlink signal from base station 110x is received by antenna 718, routed through duplexer 716, conditioned and digitized by a receiver unit 740, processed by a demodulator 742, and further processed by an RX data processor 744 to obtain received TPC commands. A TPC processor 724 then detects the received TPC commands and combines detected TPC commands for each slot to obtain a TPC decision for the slot, which is used to derive the transmit power adjustment control. TPC processor 724 or controller 720 may implement power control with spike mitigation (e.g., process 400 in FIG. 4 or process 600 in FIGS. 6A and 6B). Modulator 712 receives the control and adjusts the transmit power for the uplink transmission. Downlink power control may be achieved in a similar manner.

Controllers 720 and 770 direct the operations of various processing units within wireless device 120 and base station 110x, respectively. Controller 720 and 770 may also perform various functions for downlink and uplink power control and for spike mitigation. For example, each controller may implement the SIR estimator, TPC generator, and SIR target adjustment unit for its link. Memory units 722 and 772 store data and program codes for controllers 720 and 770, respectively.

For clarity, the spike mitigation techniques have been specifically described for uplink power control in a W-CDMA system. As such, W-CDMA terminology (e.g., SIR target, BLER target, and physical channel) is used for the description above. In general, these techniques may be used for other CDMA systems and other types of wireless communication systems that perform closed-loop power control for a data transmission. The signal quality (SIR) may be quantified by signal-to-noise ratio, signal-to-interference ratio, signal-to-noise-and-interference ratio, received signal strength, pilot strength, and so on. Data transmission performance may be quantified by BLER, frame error rate (FER), packet error rate (PER), bit error rate (BER), and so on.

The spike mitigation techniques described herein may be implemented by various means. For example, these techniques may be implemented in hardware, software, or a combination thereof. For a hardware implementation, the processing units used for spike mitigation (e.g., controller 720 and TPC processor 724 in FIG. 7) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the spike mitigation techniques may be implemented with modules (e.g., procedures, functions, and so on) that perform the functions described herein. The software codes may be stored in a memory unit (e.g., memory unit 722 in FIG. 7) and executed by a processor (e.g., controller 720). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of controlling transmit power for a data transmission in a wireless communication system, comprising:
   detecting for a transmit power spike based on a first set of at least one criterion, the transmit power spike being a sudden change in the transmit power and used to determine whether to adjust the transmit power in accordance with a first state or a second state;
   if a transmit power spike is not detected, adjusting the transmit power based on transmit power control (TPC) decisions in accordance with the first state, wherein the transmit power is increased by a first amount for each TPC decision indicating an increase in transmit power and decreased by a second amount for each TPC decision indicating a decrease in transmit power; and
   if a transmit power spike is detected, adjusting the transmit power based on TPC decisions in accordance with the second state and further to reduce change in the transmit power and reduce adverse effect of the transmit power spike, the reduced change in the transmit power resulting in greater errors in the transmit power versus directly applying the TPC decisions in accordance with the first state.

2. The method of claim 1, wherein a transmit power spike is detected if a predetermined number of consecutive TPC decisions is obtained for adjusting the transmit power in same direction as the transmit power spike.

3. The method of claim 1, wherein a transmit power spike is detected if N out of T TPC decisions are obtained for adjusting the transmit power in same direction as the transmit power spike, where N and T are integers greater than one, and N is less than T.

4. The method of claim 1, wherein a transmit power spike is detected if the transmit power is adjusted by a predetermined amount or more within a predetermined time window.

5. The method of claim 1, wherein an upward transmit power spike indicative of a sudden increase in the transmit power is detected, and wherein the adverse effect of the upward transmit power spike is reduced by limiting the transmit power to be at or below a high transmit power level.

6. The method of claim 5, wherein the high transmit power level is determined by an initial transmit power level at the time the transmit power spike is detected and a delta value.

7. The method of claim 6, wherein the delta value is a negative value, and wherein the high transmit power level is lower than the initial transmit power level.

8. The method of claim 1, wherein the adverse effect of the transmit power spike is reduced by modifying a rate of adjustment for the transmit power in same direction as the transmit power spike.

9. The method of claim 1, wherein the adverse effect of the transmit power spike is reduced by filtering TPC decisions used to adjust the transmit power.

10. The method of claim 1, further comprising:
    determining whether a termination condition has been encountered based on a second set of at least one criterion, the termination condition indicating termination of adjustment of the transmit power to reduce the adverse effect of the transmit power spike; and
    if the termination condition has been encountered, adjusting the transmit power based on TPC decisions in accordance with the first state.

11. The method of claim 10, wherein the exit condition is encountered if a predetermined amount of time has elapsed from the time the transmit power spike was detected.

12. An apparatus operable to control transmit power for a data transmission in a wireless communication system, comprising:
    a controller operative to detect for a transmit power spike based on a set of at least one criterion, the transmit power spike being a sudden change in the transmit power and used to determine whether to adjust the transmit power in accordance with a first state or a second state; and
    a transmit power adjustment unit operative to
      if a transmit power spike is not detected, adjust the transmit power based on transmit power control (TPC) decisions in accordance with the first state, wherein the transmit power is increased by a first amount for each TPC decision indicating an increase in transmit power and decreased by a second amount for each TPC decision indicating a decrease in transmit power, and if a transmit power spike is detected, adjust the transmit power based on TPC decisions in accordance with the second state and further to reduce change in the transmit power and reduce adverse effect of the transmit power spike, the reduced change in the transmit power resulting in greater errors in the transmit power versus directly applying the TPC decisions in accordance with the first state.

13. The apparatus of claim 12, wherein a transmit power spike is detected if a predetermined number of consecutive TPC decisions are obtained for adjusting the transmit power in same direction as the transmit power spike.

14. The apparatus of claim 12, wherein an upward transmit power spike indicative of a sudden increase in the transmit power is detected, and wherein the transmit power adjustment unit is operative to reduce the adverse effect of the upward transmit power spike by limiting the transmit power to be at or below a high transmit power level.

15. An apparatus operable to control transmit power for a data transmission in a wireless communication system, comprising:

means for detecting for a transmit power spike based on a set of at least one criterion, the transmit power spike being a sudden change in the transmit power and used to determine whether to adjust the transmit power in accordance with a first state or a second state;

means for adjusting the transmit power based on transmit power control (TPC) decisions in accordance with the first state if a transmit power spike is not detected, wherein the transmit power is increased by a first amount for each TPC decision indicating an increase in transmit power and decreased by a second amount for each TPC decision indicating a decrease in transmit power; and means for adjusting the transmit power based on TPC decisions in accordance with the second state and further to reduce change in the transmit power and reduce adverse effect of a transmit power spike, if the transmit power spike is detected, the reduced change in the transmit power resulting in greater errors in the transmit power versus directly applying the TPC decisions in accordance with the first state.

16. The apparatus of claim 15, wherein a transmit power spike is detected if a predetermined number of consecutive TPC decisions is obtained for adjusting the transmit power in same direction as the transmit power spike.

17. The apparatus of claim 15, wherein an upward transmit power spike indicative of a sudden increase in the transmit power is detected, and wherein the adverse effect of the upward transmit power spike is reduced by limiting the transmit power to be at or below a high transmit power level.

18. The apparatus of claim 15, wherein the wireless communication system is a Code Division Multiple Access (CDMA) system.

19. A method of controlling transmit power for a data transmission in a wireless communication system, comprising:

adjusting the transmit power based on transmit power control (TPC) decisions and in accordance with a first state if a transmit power spike is not detected, the transmit power spike being a sudden change in the transmit power;

adjusting the transmit power based on TPC decisions and in accordance with a second state if, while in the first state, an upward transmit power spike is detected based on a first set of at least one criterion, the upward transmit power spike being a sudden increase in the transmit power, the transmit power being adjusted to reduce increase in the transmit power while in the second state, the reduced increase in the transmit power resulting in greater errors in the transmit power versus directly applying the TPC decisions in accordance with the first state; and adjusting the transmit power based on TPC decisions and in accordance with a third state if, while in the first state, a downward transmit power spike is detected based on a second set of at least one criterion, the downward transmit power spike being a sudden decrease in the transmit power, the transmit power being adjusted to reduce decrease in the transmit power while in the third state, the reduced decrease in the transmit power resulting in greater errors in the transmit power versus directly applying the TPC decisions in accordance with the first state.

20. The method of claim 19, wherein in accordance with the first state, the transmit power is increased by a first amount for each TPC decision indicating an increase in transmit power and decreased by a second amount for each TPC decision indicating a decrease in transmit power.

21. The method of claim 19, wherein an upward transmit power spike is detected if a predetermined number of consecutive TPC decisions is obtained for increasing the transmit power.

22. The method of claim 19, wherein in accordance with the second state, the transmit power is adjusted based on TPC decisions and is further limited to be at or below a high transmit power level.

23. The method of claim 19, wherein in accordance with the second state, the transmit power is adjustable in a downward direction without limiting the transmit power.

24. The method of claim 19, wherein a downward transmit power spike is detected if a predetermined number of consecutive TPC decisions is obtained for decreasing the transmit power.

25. The method of claim 19, wherein in accordance with the third state, the transmit power is adjusted based on TPC decisions and is further limited to be at or above a low transmit power level.

26. The method of claim 19, wherein in accordance with the third state, the transmit power is adjustable in an upward direction without limiting the transmit power.

27. The method of claim 19, further comprising:
adjusting the transmit power based on TPC decisions and in accordance with a fourth state if, while in the second state, a condition for transitioning out of the second state is encountered.

28. The method of claim 27, wherein the condition for transitioning out of the second state is encountered if a predetermined amount of time has elapsed from the time the upward transmit power spike is detected.

29. The method of claim 27, wherein in accordance with the fourth state, the transmit power is adjusted based on TPC decisions and without limiting the transmit power.

30. An apparatus operable to control transmit power for a data transmission in a wireless communication system, comprising:

a processor operative to
derive a transmit power adjustment based on transmit power control (TPC) decisions and in accordance with a first state if a transmit power spike is not detected, the transmit power spike being a sudden change in the transmit power, derive the transmit power adjustment based on TPC decisions and in accordance with a second state if, while in the first state, an upward transmit power spike is detected based on a first set of at least one criterion, the upward transmit power spike being a sudden increase in the transmit power, the transmit power being adjusted to reduce increase in the transmit power while in the second state, the reduced increase in the transmit power resulting in greater errors in the transmit power versus directly applying the TPC decisions in accordance with the first state, and derive the transmit power adjustment based on TPC decisions and in accordance with a third state if, while in the first state, a downward transmit power spike is detected based on a second set of at least one criterion, the downward transmit power spike being a sudden decrease in the transmit power, the transmit power being adjusted to reduce decrease in the transmit power while in the third state, the reduced decrease in the transmit power resulting in greater errors in the transmit power versus directly applying the TPC decisions in accordance with the first state; and a transmit power adjustment unit operative to adjust the transmit power based on the transmit power adjustment.

31. The apparatus of claim 30, wherein an upward transmit power spike is detected if a predetermined number of consecutive TPC decisions is obtained for increasing the transmit power.

32. The apparatus of claim 30, wherein in accordance with the second state, the transmit power is adjusted based on TPC decisions and is further limited to be at or below a high transmit power level.

33. An apparatus operable to control transmit power for a data transmission in a wireless communication system, comprising:

means for adjusting transmit power based on transmit power control (TPC) decisions and in accordance with a first state if a transmit power spike is not detected, the transmit power spike being a sudden change in the transmit power;

means for adjusting transmit power based on TPC decisions and in accordance with a second state if, while in the first state, an upward transmit power spike is detected based on a first set of at least one criterion, the upward transmit power spike being a sudden increase in the transmit power, the transmit power being adjusted to reduce increase in the transmit power while in the second state, the reduced increase in the transmit power resulting in greater errors in the transmit power versus directly applying the TPC decisions in accordance with the first state; and means for adjusting transmit power based on TPC decisions and in accordance with a third state if, while in the first state, a downward transmit power spike is detected based on a second set of at least one criterion, the downward transmit power spike being a sudden decrease in the transmit power, the transmit power being adjusted to reduce decrease in the transmit power while in the third state, the reduced decrease in the transmit power resulting in greater errors in the transmit power versus directly applying the TPC decisions in accordance with the first state.

* * * * *

UNITED STATES PATENT AND TRADEMARK OFFICE
CERTIFICATE OF CORRECTION

PATENT NO. : 7,657,275 B2 Page 1 of 1
APPLICATION NO. : 10/841299
DATED : February 2, 2010
INVENTOR(S) : Kasturi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1440 days.

Signed and Sealed this

Twenty-eighth Day of December, 2010

David J. Kappos
*Director of the United States Patent and Trademark Office*